May 22, 1934. C. H. HAPGOOD 1,959,581
TEAT CUP FOR MILKING MACHINES
Filed Oct. 29, 1931
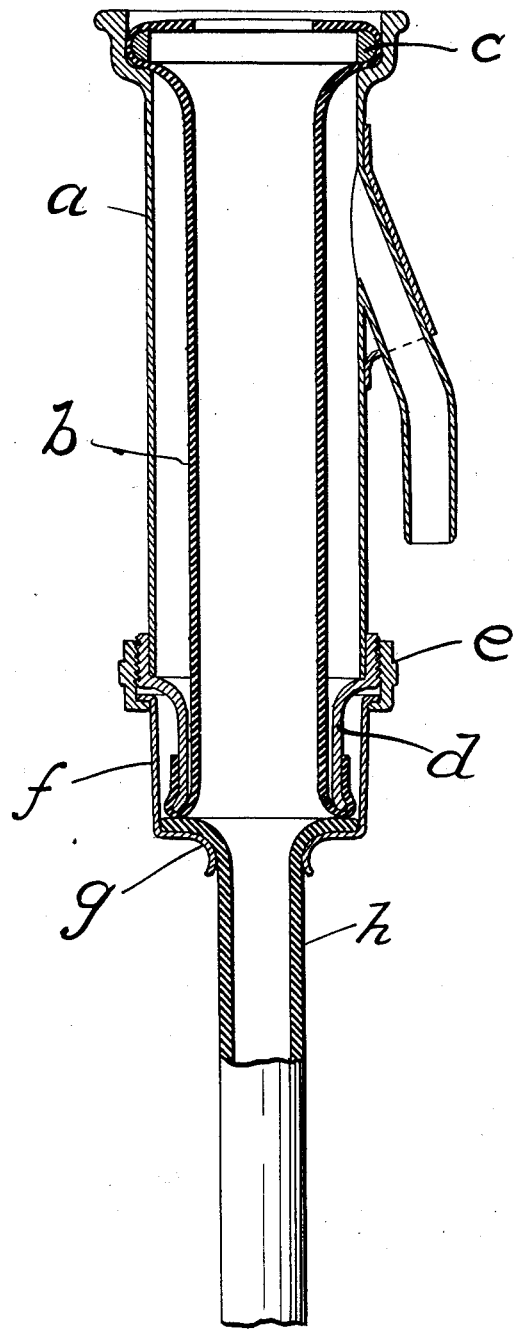
WITNESS:
INVENTOR
Cyrus Howard Hapgood
BY
Busser & Harding
ATTORNEYS Patented May 22, 1934

1,959,581

UNITED STATES PATENT OFFICE 1,959,581

TEAT CUP FOR MILKING MACHINES

Cyrus Howard Hapgood, Nutley, N. J., assignor to The De Laval Separator Company, New York, N. Y., a corporation of New Jersey Application October 29, 1931, Serial No. 571,752

1 Claim. (Cl. 31—85)

The object of the invention is to provide a teat cup which retains all the advantages of a relatively efficient, satisfactory and durable known commercial teat cup and which exhibits substantial advantages thereover. The nature of the improvement may be best understood by the following description taken in connection with the accompanying drawing, which is a longitudinal sectional view of a teat cup embodying my invention.

The teat cup comprises an outer metal shell the main body $a$ of which is expanded at its upper end and an inner rubber liner $b$ which stretched and expanded at its upper end and there held within the expanded upper end of the shell $a$ by means of an internal ring $c$. The lower member $d$ of the shell may be integral with the main body $a$, but is preferably a separate piece, the upper end of which embraces and is secured to the lower end of the shell body $a$, while the lower end is contracted and is bent slightly outward at its extremity. The lower end of the liner extends within and is bent around the lower extremity of the member $d$ of the shell. A well known commercial teat cup embodies the above structural features. In such known teat cup a ring $e$ is threaded on the upper end of member $d$ and this ring carries a member, which may or may not be integral with the ring, comprising a part similar to $f$ provided with an inwardly extending shoulder similar to $g$ and a downwardly extending nozzle on which the end of the milk hose is slipped; and the bent around lower end of the liner is confined between said shoulder and the lower extremity of the shell member $d$.

In a teat cup so constructed, the milk contacts with metal, causing a chemical reaction between the wet metal and the sulfur of the rubber with resultant eating away of the inner surface of the shoulder $g$, thereby damaging both the rubber and the metal, contaminating the milk and shortening the life of the teat cup.

In the improvement, embodying my invention, shown in the drawing, the upper end of the hose $h$ is provided with an expanded upper end, and the contracted lower end $g$ of member $f$ affords a shoulder surrounding the expanded upper end of the hose $h$ and pressing it against the bent around lower end of the liner $b$ and thus confining the liner between the hose $h$ and the lower extremity of member $d$. Thereby there is no contact of milk with metal; there is no deteriorating metal surface to contaminate the milk and no impairment of rubber or metal, and the life of the teat cup is prolonged.

The type of commercial teat cup herein described, notwithstanding the objections thereto, is a comparatively efficient and satisfactory teat cup. My improvement therein retains all the advantageous structural features of such a teat cup, while it eliminates all the objectional features.

It is known to make the milk hose and the liner in one integral piece, thereby avoiding contact of milk with metal; but this construction is open to serious objections in that the liner tends to split along longitudinal lines and in that a worn liner cannot be maintained in stretched condition; and discarding a liner necessitates discarding what is usually a perfectly good hose.

What I claim and desire to protect by Letters Patent is:

A teat cup assembly comprising an outer shell having a contracted lower end, an internal rubber liner whose lower end extends around the lower extremity of the contracted lower end of the shell, a member whose upper end is threaded on the shell and which has a contracted lower end extending below the lower extremity of the shell, and a rubber hose extending within the contracted lower end of said member, said hose having an expanded upper end which is confined by said member against the part of the liner which extends around the lower extremity of the shell, whereby milk outflowing from the milk chamber of the teat cup through the hose contacts only with rubber, thereby avoiding impairment of both rubber and metal as well as contamination of milk by contact with metal.

CYRUS HOWARD HAPGOOD.